INVENTORS
EIICHI MARUYAMA, MITSURU OIKAWA,
TSUTOMU KOMODA
BY
H. Edward Mestern

INVENTORS,
EIICHI MARUYAMA, MITSURU OIKAWA, TSUTOMU KOMODA
BY
H. Edward Mosler

INVENTORS
EIICHI MARUYAMA, MITSURU OIKAWA,
TSUTOMU KOMODA
BY
H. Edward Mastern

United States Patent Office 3,558,527 Patented Jan. 26, 1971

3,558,527

METHOD OF PRODUCING CATHODOCONDUCTIVE TARGET FROM SELENIUM AND AN ALKALI METAL

Eiichi Maruyama, Hachioji-shi, Tokyo-to, Mitsuru Oikawa, Suginami-ku, Tokyo-to, and Tsutomu Komoda, Hachioji-shi, Tokyo-to, Japan, assignors to Kabushiki Kaisha Hitachi Seisakusho, Tokyo-to, Japan, a joint-stock company of Japan Original application Mar. 25, 1965, Ser. No. 442,587. Divided and this application Sept. 27, 1967, Ser. No. 679,954

Claims priority, application Japan, Apr. 3, 1964, 39/18,548

Int. Cl. H01b *1/00*

U.S. Cl. 252—500 1 Claim

ABSTRACT OF THE DISCLOSURE

A method of producing a cathodoconductive material from selenium and an alkali metal activator by melting.

This application is a division of Ser. No. 442,587, filed Mar. 25, 1965, now abandoned.

This invention relates to electron beam targets and more particularly to improvements in and relating to so-called cathodoconductive targets applicable to a wide range of uses including those in apparatuses such as television-electron-microscopes.

When certain materials are bombarded by an electron beam of relatively high energy, the conductivity (hereinafter referred to as "induced conductivity") of the part so bombarded increases remarkably. This phenomenon is generally known as the cathodoconductive effect. Moreover, there are known apparatuses in which there are utilized devices for converting light images or electronic images into electric signals by picking up electric signals from the layer of these materials in accordance with the degree of difference of the above mentioned induced conductivity or devices adapted to amplify the image. Among these apparatuses, image devices for use in television-electron-microscopes or television pickup tubes called "ebicons" are also known.

It is an object of the present invention to provide new materials exhibiting the cathodoconductive effect (hereinafter referred to as cathodoconductive materials) and to provide improvements in targets in which cathodoconductive materials are used. One example of such improvements is a substantial increase in the sensitivity in apparatuses such as the aforementioned television-electron-microscopes.

It is a further object of the invention to make possible, by these improvements, viewing of images in electron microscopes of low electron current density and to facilitate the viewing of images in electron microscopes of substances which are readily destroyed by high-intensity electron beams.

Another object of the invention is to provide a cathodoconductive target of relatively simple construction and operation which is applicable to a wide range of uses.

According to the present invention, briefly stated, there is provided a cathodoconductive target having a layer of cathodoconductive material adapted to cause induction of conductivity in accordance with bombardment thereof by electrons, said material being a selenium preparation exhibiting n-type conductivity.

Such a selenium preparation can be prepared by causing selenium of high purity to contain from 0.02 to 1 mol percent of an activator consisting of at least one alkali metal, as will be described more fully hereinafter.

According to the invention there are further provided an improved electrode for the cathodoconductive layer and an electron beam image conversion device in which the above stated cathodoconductive target is utilized.

The nature, principle, and details of the invention will be more clearly apparent from the following description with respect to a preferred embodiment of the invention, when taken in conjunction with the accompanying drawings in which.

Figure 1:
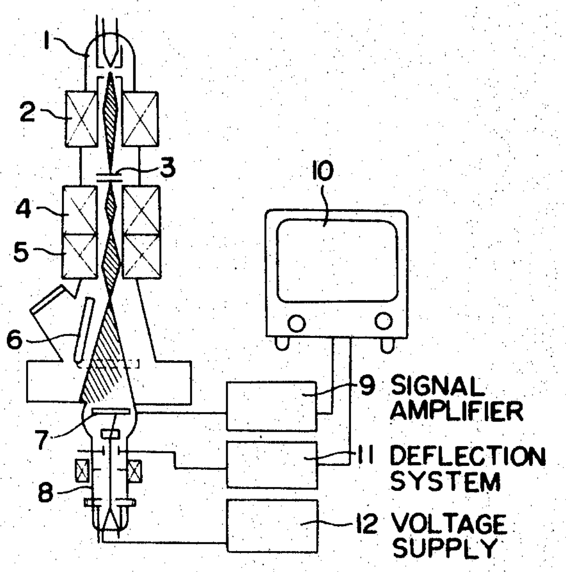
FIG. 1 is a schematic diagram showing the entire essential composition and arrangement of a television-electron-microscope.

Referring to FIG. 1, in the television-electron-microscope shown therein, an electron beam emitted from an electron gun 1 passes through a condenser lens 2, a sample 3, an objective lens 4, and a magnifying lens 5 and then, becoming an electron beam of relatively high energy of an accelerating voltage of the order of from 50 to 100 Kv., for example, corresponding to the shape of the sample 3, impinges on a cathodoconductive layer target 7. Then, a latent image formed on the target 7 of induced conductivities differing in correspondence with the shape of sample 3 is converted into an electrical signal through the scanning of an electron beam of an electron beam scanning device 8 provided on the side of the target 7 opposite from the side of the electron gun 1. The electrical signal so produced is passed through a signal amplifier 9 and forms a magnified image of the sample 3 in a television receiver 10.

The electron microscope is further provided with a phosphorescent screen 6 which, upon being swung to the position indicated by dotted line, can be used to form an image similarly as in an ordinary electron microscope. The scanning device 8 is provided with an electron beam deflection system 11 and a filament voltage supply 12.

Figure 2:
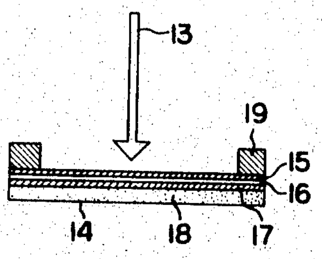
FIG. 2 is a sectional view showing the essential construction of a target embodying the invention.

The essential construction of a preferred embodiment of the target according to the invention suitable for use in apparatuses such as that shown in FIG. 1 is shown in FIG. 2. This target comprises a metal-film electrode 15, a supporting film 16 of a substance such as resin, a metal-film electrode 17, and a cathodoconductive layer 18 in laminate arrangement in the sequence set forth from the side of the high-energy electron beam 13 emitted from the electron gun 1 to the side of the surface scanned by the electron beam 14 of the low-velocity electron beam scanning device 8. A metal ring 19 is disposed on the target around the peripheral part thereof.

When an electron beam image due to a high-speed electron beam such as that of the aforedescribed electron microscope, for example, is projected on a target of the above described construction, a variation of induced conductivity occurs within the cathodoconductive layer 18. This variation is converted into an electrical signal between the electrode 17 and the low-speed electron beam 14. Since the high-speed electron beam produces a large number of charge carriers in the cathodoconductive layer 18 during this operation, current amplification is accomplished between the change $\Delta Ip$ of the high-speed electron beam density and the change $\Delta Is$ of the density of the low-speed electron current induced thereby, and the current gain G becomes representable by $G=\Delta Is/\Delta Ip$. The higher the value of the current gain G is, the higher is the sensitivity.

As substances suitable for the cathodoconductive layer 18, substances such as selenium, arsenic sulphide, sino sulphide, cadmium sulphide, cadmium selenide, and aluminum oxide have heretofore been known. Among these substances, selenium has a relatively high sensitivity at room temperature.

However, the sensitivity required in a device of this character is much higher than that afforded by a layer in which selenium is used as in the conventional practice, and the elevation of the sensitivity in such layers has been desired but heretofore not attained.

Furthermore, for the metal film electrode 17 functioning as an electrode with respect to the selenium film, aluminum has been used in almost all cases, perhaps on the basis of the mere fact that it is a light metal and readily transmits an electron beam. However, there has apparently been no further and sufficient study relating to the selection of this metal.

The present invention contemplates the elimination of the above stated deficiencies and the provision of improvements in cathodoconductive targets, as described in detail hereinbelow.

First, for the cathodoconductive material of the target according to the invention, a selenium prepared by adding thereto and mixing therewith from 0.02 to 1.00 mol percent of one or more than one activator (impurity) selected from alkali metals such as sodium, potassium, rubidium, and cesium or from metals such as bismuth, indium, tin, cadmium, and silver, said activators causing selenium so containing them to exhibit n-type conductivity. The selenium so prepared is formed as a thin film layer by evaporation or deposition, for example, on the metal film electrode 17 as shown in FIG. 2.

As is well known, pure selenium exhibits p-type conductivity. We have found as a result of our research, however, that selenium into which the above stated proportion (0.02 to 1.00 mol percent) of an alkali metal such as those named above or a metal such as bismuth, indium, tin, cadmium, and silver has been introduced exhibits n-type conductivity in all cases and that, moreover, the current gain due to cathodoconductivity is higher in all cases than that of p-type, pure selenium. We have found further that, while a selenium prepared by adding tellurium or iodine as an impurity to pure selenium exhibits p-type conductivity, its current gain as a target is lower in all cases than that of the above mentioned selenium having n-type conductivity (hereinafter referred to as "n-type selenium").

In addition, we have found that, among the different n-type seleniums, those doped with the above specified proportion of an alkali metal as above mentioned have particularly high current gains.

Although vitreous selenium has high resistivity, it crystallizes at a high temperature, and its conductivity increases. However, in an apparatus in which, as illustrated by the example in FIG. 1, low-speed electron beam scanning of the vidicon type is carried out, and the accumulation of electric charge on the selenium film is utilized, a high conductivity of the target is not desirable. That is, a target having a film resistance of 100 megohms/cm.$^2$ or less cannot be used. Accordingly, as a practical problem in the production of target films, it is necessary to prevent the crystallization of the selenium.

Figure 3:
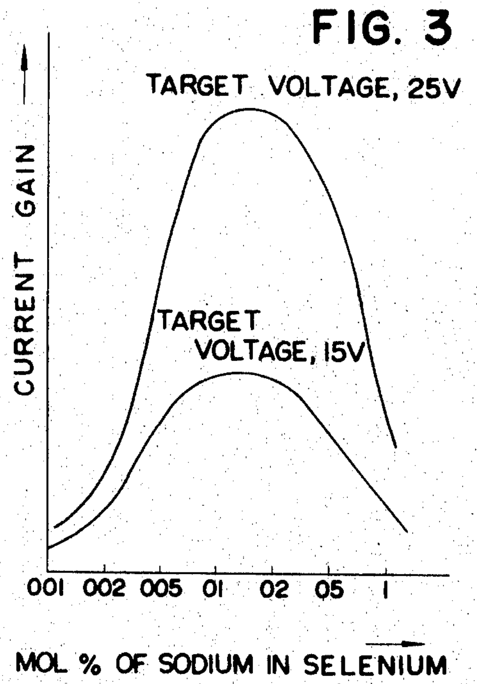
FIGS. 3, 4, and 5 are graphical representations indicating characteristics for a description of the effectiveness of the device according to the invention.

The relationship between the impurity content and the current gain in a target according to the invention in which selenium which is doped with sodium, for example, is used as the cathodoconductive material of the target is indicated in FIG. 3, which is based on the results of our experiments. It is apparent from FIG. 3 that a target film containing the specified quantity of sodium according to the invention has a current gain of the target which is substantially higher than that of a conventional target not containing the specified quantity (for example, a target film having a sodium content less than 0.02 mol percent).

We have found that the same tendency as in the above mentioned case of sodium is observable also in the case of doping with one alkali metal such as potassium, rubidium, or cesium or in the case of doping with a mixture of a plurality of such metals. We have further found the same effect also in the case of metals other than these alkali metals, that is, in the case of metal causing the selenium to assume n-type conductivity such as, for example, bismuth, indium, tin, cadmium, and silver.

Figure 4:
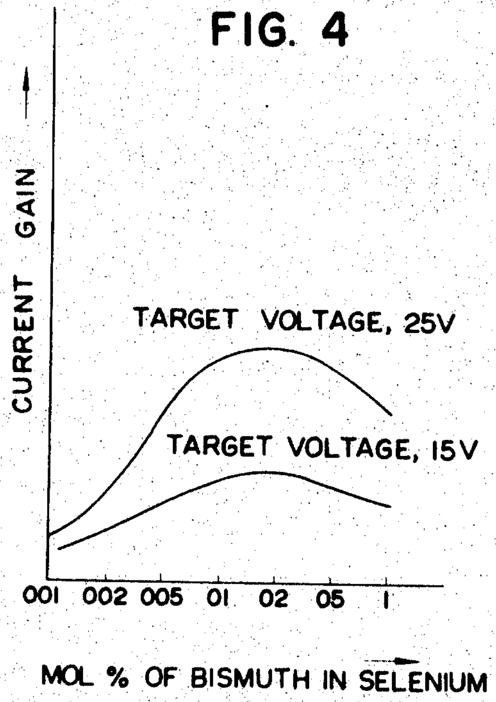
Figure 5:
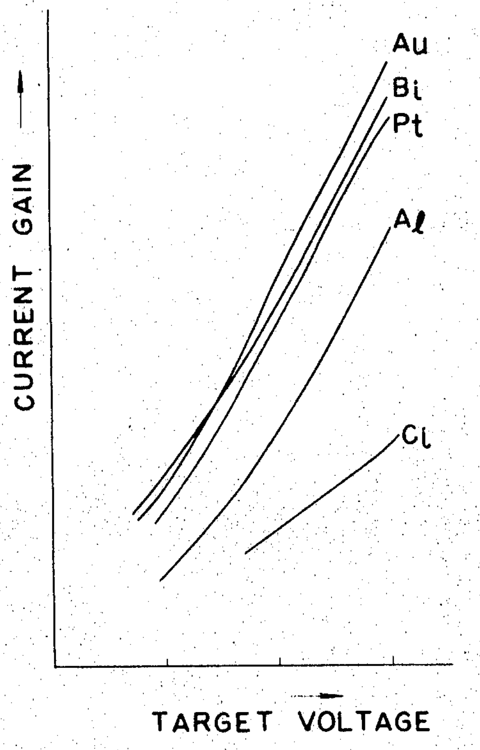

The relationship between current gain and impurity content in an example case of selenium doped with bismuth is indicated in FIG. 4.

It was also confirmed that, when a small quantity of a different impurity such as calcium, for example, is mixed either accidently or intentionally in the original selenium, there is no adverse effect on the sensitization due to the doping impurity.

The method of doping the original selenium with an activator consisting of an alkali metal will be apparent from the following examples of procedure.

In the case of sodium or potassium, a specified quantity of metallic sodium or metallic potassium is melted together with selenium of high purity in an inert gas such as nitrogen or argon or in a vacuum of $10^{-4}$ atmosphere or lower pressure at a temperature of from 350 to 400 degrees C. and mixed for approximately 2 hours so as to produce an amply uniform mixture. Then, in order to avoid the effect of segregation, the mixture is cooled and solidified at an amply high cooling rate to produce the desired material.

In the case of rubidium or cesium, a specified quantity of the chromate of the metal is ignited together with a reducing agent such as silicon, for example, in a vacuum of $10^{-4}$ atmosphere or lower pressure to cause gases of these metals to be given off. These gases are introduced into a glass tube in which selenium is sealed and are caused to melt and mix with the selenium.

An alternative method is to cause a specified quantity of a suitable compound of the activator metal such as, for example, sodium selenite or potassium selenite, to melt and mix with the original selenium, whereby a cathodoconductive material having a similar sensitization effect can be produced.

Next, the metal film electrode 17 to serve as an electrode for the selenium was considered. Because of the difference between the work function of this metal film electrode 17, itself, and the work function of the selenium, various kinds of surface barriers are formed in the contact surface, whereby the current gain G differs considerably with the electrode material. On the basis of this consideration and our experimental results, it was found that higher gains can be obtained by the use of an electrode of metals such as gold, platinum, and bismuth than by the use of aluminium according to conventional practice, as is indicated in FIG. 4. It was found that among these preferable metals, gold produces the best results.

Furthermore, the principal characteristics required for the metal film electrode 17 are that there be no chemical reaction between the electrode material and the selenium film during storage of the target and that the metal film electrode 17 be of a metal which can be readily formed into a smooth, even surface on the supporting film 16 of the resin, as will be described hereinafter, in order to preserve the quality of the image. It was found upon consideration of these requirements that gold is excellent for the electrode.

Since the selenium film, itself, is mechanically weak, it is difficult to cause it to be directly self-supported on a structure such as the metal ring 19 shown in FIG. 2. In actual practice, a supporting film 16 made of a resin such as polystyrene or polyethylene terephthalate, for example, is used. In this case, however, since the supporting film, itself, is an insulator, an accumulation of electric charge is caused on its surface by electron beam irradiation, whereby the surface potential changes, and a good signal output cannot be produced. The metal film electrode 15 is provided for the purpose of preventing this undesirable phenomenon and is preferably made of a metal such as aluminium, gold, or silver which can form a smooth film with relative ease on the synthetic supporting film 16.

As described above, the present invention provides a target such as a target for an image amplification of an electron microscope, for example, wherein the target current gain can be remarkably increased by the use of a selenium having n-type conductivity such as, for example, selenium doped with one or more than one alkali metal such as sodium, potassium, rubidium, or cesium, and by the use of gold for the electrode of this selenium. For example, with bombardment by a primary electron beam of 100 kv., a current gain of maximum value of from 5,000 to 7,000, corresponding to 4 to 6 times that heretofore obtainable, can be obtained in the target according to the present invention.

By these improvements in the target, it becomes possible not only to view electron microscope images of low electron current density of the water of $10^{-12}$ a./cm.$^2$ which hitherto could not be observed even through the use of an image amplifier, not to mention a fluorescent plate, but also to view readily electron microscope images of substances which are easily damaged or destroyed by strong electron beams.

Thus, the cathodoconductive target of the present invention is highly effective for application not only to television-electron-microscopes but also to a wide scope of uses including camera tubes such as an "ebicon."

For example, the cathodoconductive target according to the invention can be effectively applied to an electron beam image conversion device comprising the target as described above, means to cause bombardment of the cathodoconductive layer with electrons of a velocity sufficient to produce induced conductivity in said layer, and means to cause potential difference within said layer thereby to cause electric current to pass therethrough.

It should be understood, therefore, that the foregoing disclosure relates to only a preferred embodiment of the invention and a few modifications thereof and that it is intended to cover all changes and modifications of the examples of the invention herein chosen for the purposes of the disclosure, which do not constitute departures from the spirit and scope of the invention as set forth in the appended claim.

What we claim is:

1. A method for producing a cathodoconductive material for electron beam targets which comprises melting, together with selenium of high purity, from 0.02 to 1.00 mol percent of at least one activator selected from the alkali metal group consisting of sodium and potassium in a non-active atmosphere at a temperature of from 350 to 400 degrees C. for approximately two hours, during which time the resulting molten mixture is mixed well for uniform composition, and then rapidly cooling and solidifying said molten mixture at a cooling rate sufficient to prevent segregation effect.

References Cited

UNITED STATES PATENTS

| | | | |
|---|---|---|---|
| 1,926,884 | 9/1933 | Presser | 317—241 |
| 2,008,753 | 7/1935 | Downing et al. | 23—50 |
| 2,426,173 | 8/1947 | Bloom | 317—241 |
| 2,430,255 | 11/1947 | Stewart | 23—50 |
| 2,453,763 | 11/1948 | Smith, Jr. | 317—241 |
| 2,736,672 | 2/1956 | Klein | 317—241 |
| 2,903,632 | 9/1959 | Perotte | 317—241 |
| 3,174,823 | 3/1965 | Kopelman | 23—204 |

DOUGLAS J. DRUMMOND, Primary Examiner

U.S. Cl. X.R.

23—50